Aug. 27, 1963  E. EICHENBERGER, JR  3,102,175
WATER SOFTENER SALT LEVEL INDICATOR SWITCH
Filed Oct. 24, 1960  3 Sheets-Sheet 1

INVENTOR.
EDWARD
EICHENBERGER, JR.
BY M. A. Hobbs
ATTORNEY

Aug. 27, 1963    E. EICHENBERGER, JR    3,102,175
WATER SOFTENER SALT LEVEL INDICATOR SWITCH
Filed Oct. 24, 1960    3 Sheets-Sheet 2

*INVENTOR.*
EDWARD EICHENBERGER, JR.
BY *M. A. Hobbs*

ATTORNEY

United States Patent Office 3,102,175
Patented Aug. 27, 1963

3,102,175
WATER SOFTENER SALT LEVEL INDICATOR
SWITCH
Edward Eichenberger, Jr., 756 E. John St.,
Nappanee, Ind.
Filed Oct. 24, 1960, Ser. No. 64,561
8 Claims. (Cl. 200—61.05)

The present invention relates to water softeners, and more particularly to an indicator switch for the dry salt level of zeolite water softeners.

In zeolite water softeners, it is necessary to remove the accumulated minerals from the zeolite in the softening tank, usually by rinsing it with brine. This brine is produced by mixing solid salt and water delivered to the brine tank of the water softener, and then is stored for use either in the dissolving tank or in a separate measuring tank, or it is sent directly to the zeolite, or exchange, tank. Although having the separate measuring tank is initially more expensive, it is often preferable, since a large volume of salt can be stored dry in the dissolving tank, requiring less frequent filling and cheaper bulk loads of salt, and the equipment is readily adapted to automatic control. Furthermore, since the separate measuring tank has a deeper draw-down of brine than is possible in the single brine tank installation, greater accuracy is attained in brine measurement.

However, it is very easy to forget to refill the tank when the salt is completely used, since a large amount of dry salt is placed in the dissolving tank at one time, both in the two-tank regeneration system and in the system sending the brine directly to the exchange tank. The resulting damages and inconveniences of hard water, as well as the wastage of water that results when the softening equipment regenerates automatically without brine, can be quite expensive in time and poorly washed clothing, dishes, and skin, as well as industrially, in damaged equipment. Therefore, it is one principal object of the present invention to provide a salt level indicator switch which will operate a buzzer, light or other warning device when the salt level drops to a predetermined point.

In the dissolving tank the water flows in near the bottom, dissolves the salt, and flows out into the measuring tank, while the dry salt flows down as the base of the pile is dissolved. Often the top of the tank is open to provide a greater storage space for the dry salt. If for any reason the valve controlling the flow of water into the dissolving tank becomes held in the open position, the water will fill that tank, dissolving the salt and flowing over, possibly damaging the exterior of the tank and nearby equipment with the highly corrosive brine. Therefore, another object of the present invention is to provide an indicator switch which will operate a signalling device whenever the water level rises to the predetermined point in the dissolving tank.

A further object of the invention is to provide an indicator switch of the above type which is simple in construction and operation, and which is readily mounted on the tank with tools that may be found in most home and industrial workshops.

Additional objects and advantages will become apparent from the following description and accompanying drawings, wherein.

Figure 1:
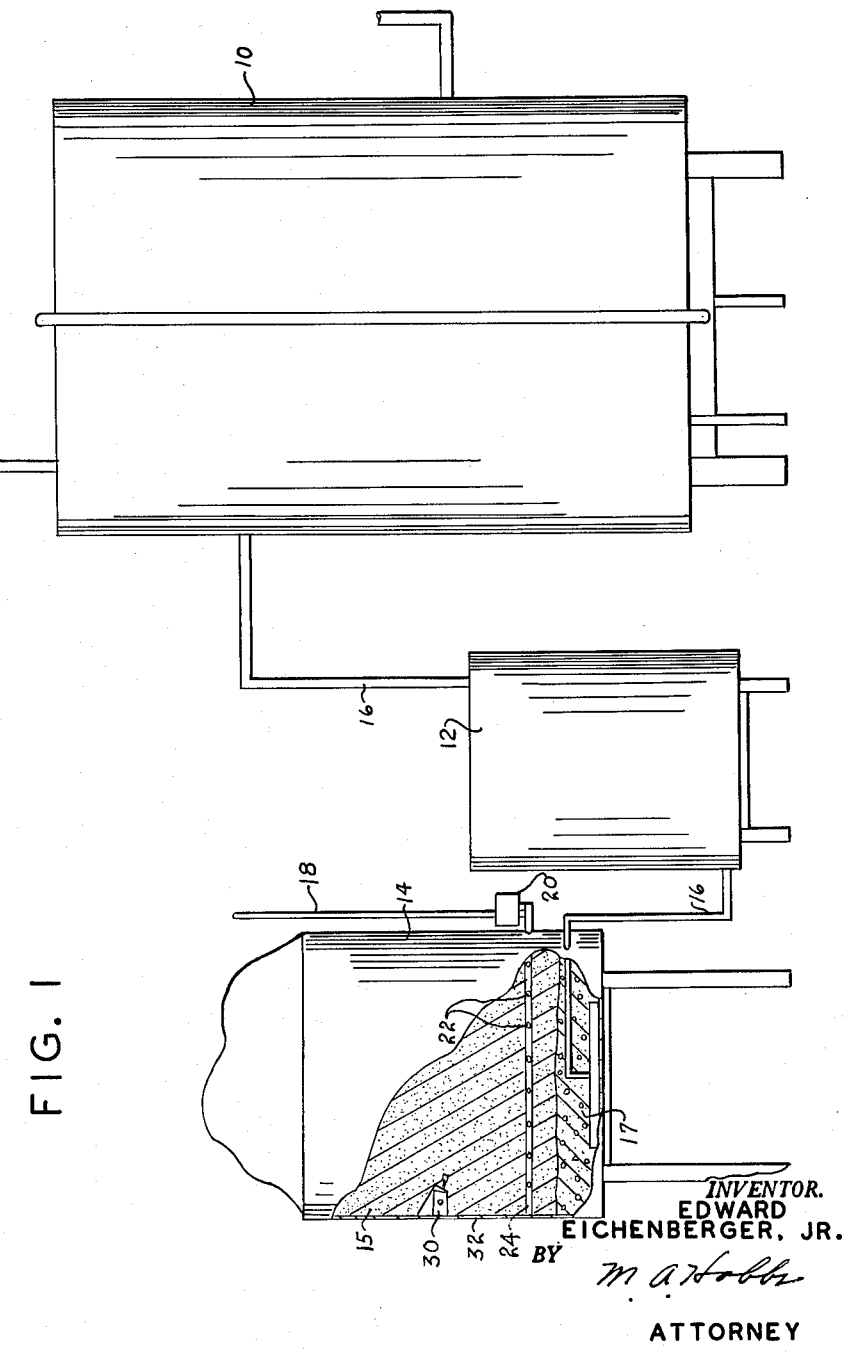
FIGURE 1 is an elevational and partial cross sectional view of a water softener with a two-tank regeneration system, showing the present invention mounted therein.

In FIGURE 1, the water softener includes an exchange tank 10, a brine measuring tank 12, and a brine dissolving tank or saturator 14, connected together with suitable piping 16. The saturator contains dry salt 15 resting on a bed of gravel 17 or the like. Water reaches the dissolving tank through a line 18, controlled by a valve 20, and enters the tank through holes 22 in pipe 24. In the form of water softener shown in the figure, valve 20 is a float controlled valve, the valve closing whenever the water in the saturator rises to a predetermined level, but the particular construction of that valve and of the water softener itself is not important to the present invention.

Figure 2:
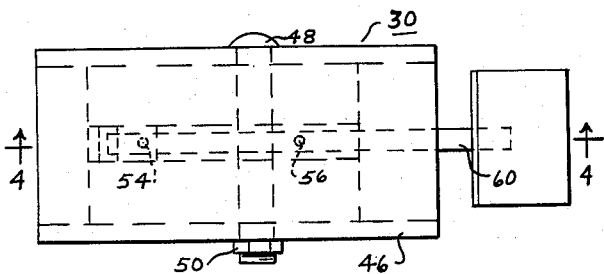
FIGURE 2 is a top plan view of the indicator switch.
Figure 4:
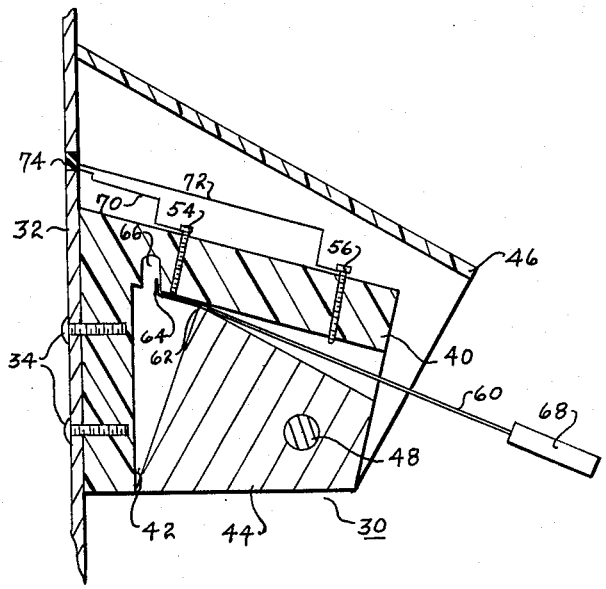
FIGURE 4 is a vertical cross sectional view of the switch taken on line 4—4 of FIGURE 2, showing the switch in the position assumed when the dissolving tank is filled with salt.
Figure 3:
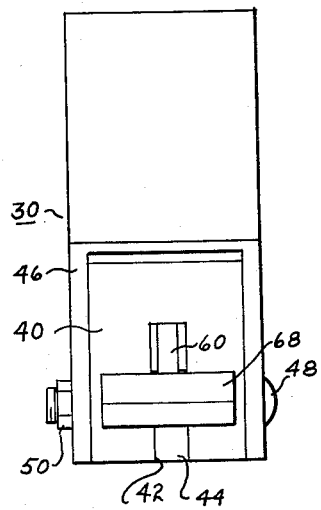
FIGURE 3 is an end elevational view of the switch.
Figure 5:
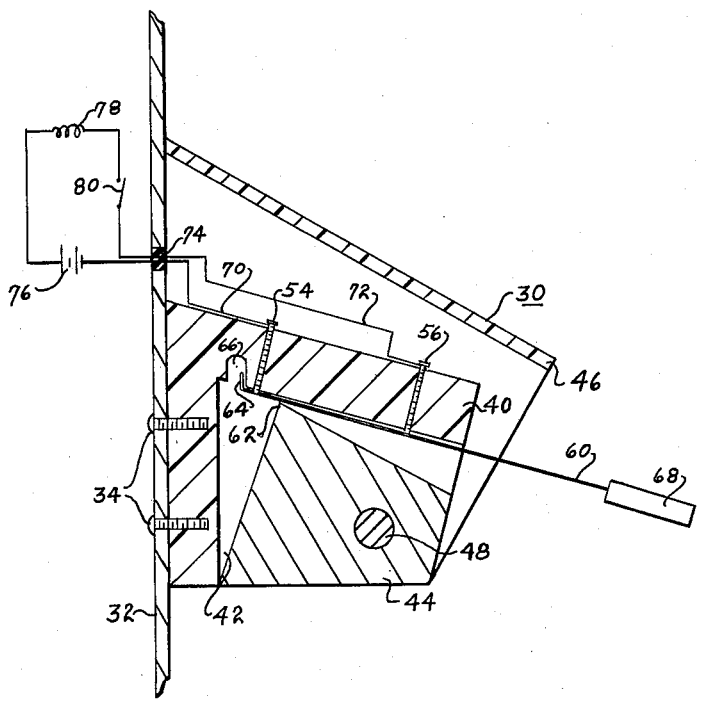
FIGURE 5 is a vertical cross sectional view taken on the same line as the previous figure, showing the switch in the position it assumes when the salt level falls too low.

The indicator switch 30 is mounted on the side wall 32 of the dissolving tank by screws 34 or the like, as seen in FIGURES 4 and 5, positioned as in FIGURE 1 at the desired minimum level of salt. The switch includes a base 40 of wood, plastic, or other non-conducting material, with groove 42 cut out to receive block 44. Cover 46 is placed over base 40 and the assembly is secured by bolt 48 and nut 50. Contact screws 54 and 56 are mounted in base 40 along line 4—4 of FIGURE 2 and act both as contact points and as binding terminals. These two contact screws act with a strip of spring steel or brass element 60 to form a closed switch, the spring being held in proper position by block 44, the top 62 of that block being a pivot for the spring. One end 64 of the spring is bent upward into extension 66 of groove 42 to prevent the spring from sliding longitudinally, and the other end of the spring has a plate 68 of a material sufficiently light that its weight alone is not sufficient to break the contact between the spring and screw 56. Plate 68 is broad enough that the salt falling on it will be sufficient to move the spring and open the switch. However, the spring is strong enough that the salt remaining on the plate when the salt level falls too low will not prevent the spring from moving upward and closing the switch. Block 44 is formed to allow the spring to be moved freely between an open and a closed position, and the block acts as a stop to limit the downward movement of the spring. Contact 56 may be placed in block 44 so that the switch is closed by the weight of the salt rather than opened as in the embodiment illustrated in the drawings.

Wires 70 and 72 are connected to screws 54 and 56, respectively, and extend through wall 32 of the tank, the hole being sealed by a grommet 74 of rubber or the like. Outside the tank the wires are connected to an alarm system, the one shown having a battery or other power supply 76, a coil 78 representing the buzzer, bell, light, or other signalling device, and a switch 80 for disconnecting the indicator for emptying the tank for inspection or the like. However, with the exception of the design of the switch 30, the particular circuit is not important to the present invention.

In use, switch 30 is mounted as seen in FIGURE 1 at the desired minimum level of salt in the tank, and the signalling circuit is connected to the switch. When salt is poured into the tank, it presses down on plate 68, depressing the spring and breaking contact between the spring and screw 56. In this process, cover 46 protects the wiring from damage by the salt pellets and directs much of the salt falling on it to plate 68, insuring that the switch will be opened by the salt. The weight of the salt will keep the switch open until the level falls below the position of plate 68, at which time the spring 60 is released to close the contact and operate the signalling device, so that the tank will be filled again with salt.

If at any time in the operation of the water softener valve 20 opens and remains open for any reason, such as clogging, the water rises in the tank to the switch. If the switch is open, the salt is at least as deep as the level of the switch, so that the water rising must dissolve or partially dissolve the salt, and form a saturated brine solution. Reaching the switch, the brine enters the open front of the switch and touches both the spring and contact screws 56. Since the salt (sodium chloride) is an electrovalent compound, a solution of the salt and water is a good conductor of electricity, and when this solution comes in contact with the electrical contacts, the indicator circuit is closed and the light or buzzer is actuated. The person investigating the reason for the alarm is able to correct the situation before the brine runs out of the tank to waste salt and damage the equipment. The present indicator switch will respond to other bulk materials of electrovalent compounds in the same way as it responds to salt, i.e. while the material is dry the switch is closed or opened when the material falls below a predetermined level and is in effect closed when a solution of the material contacts the exposed electrical switch elements.

It is also possible to connect the present switch to the inlet valve of the dissolving tank to close the valve whenever the switch is closed, thus preventing the regeneration cycle whenever there is insufficient salt to perform it, and also cutting off the water whenever it rises too high. Various other modifications may be made in the design and use of the switch. For example, a contact screw can be mounted in block 44 in addition to or in place of contact 56 so that a circuit is closed whenever the spring is depressed, for example to light a bulb indicating that the switch is actuated. Also, base 40 and cover 46 may be made integrally to facilitate the installation of the switch in the tank, and various contacts, mounting means and materials may be used with the switch for various applications.

In case the spring 60 rusts, as may very well occur if brine comes in contact with it, it can be replaced easily and inexpensively by removing bolt 48, cover 46 and block 44, slipping the old spring out, and slipping the new one in. As soon as the cover and bolt 48 are replaced, the switch may be used again immediately, since it need never be removed from the tank.

The present invention may be used in many applications wherever it is desirable to have a warning when granulated or powdered material falls below a level in a container. Furthermore, various changes and modifications may be made in the apparatus without departing from the scope of the invention.

I claim:

1. A water and salt level indicator switch adapted to be mounted within a water softener salt tank and to respond to a predetermined amount of undissolved salt in the tank, comprising a base of non-conducting material having a groove, a block, a leaf spring held within said groove by said block, contacts mounted on said base for contacting said spring, a plate mounted on one end of said spring for responding to the weight of the salt for making and breaking contact between one of said contacts and said spring, and a cover on said switch, said cover having an opening in the lower portion thereof to permit brine to reach the spring and the contact and connect the two electrically.

2. A water and salt level indicator switch responsive to the amount of undissolved salt in a salt dissolving tank and the like, comprising a base of non-conducting material having a groove, a spring in said groove, contacts mounted on said base for contacting said spring, a plate mounted on one end of said spring for responding to the weight of the salt for making and breaking contact between one of said contacts and said spring, and a cover on said switch, said cover having an opening to permit brine to reach the spring and the contact and connect the two electrically.

3. A salt level indicator switch for a salt dissolving tank, comprising a base of non-conducting material, a leaf spring, means holding one end of said spring adjacent said base, contacts mounted on said base for contacting said spring, means mounted on one end of said spring for actuating said switch, and a cover on said switch, said cover having an opening to permit brine to reach the spring and the contacts and connect them electrically.

4. A level indicator switch for bulk material, comprising a base of non-conducting material, resilient electrical element, means holding a portion of said element adjacent said base, contacts connected to said base for contacting said element, means connected to said element for responding to the weight of the bulk material for making and breaking contact between one of said contacts and said element, and a cover for said switch having an opening to permit said bulk material to come in contact with said contacts and element.

5. An indicator switch responsive to the amount of undissolved salt in a salt dissolving tank, comprising a base, a conducting movable element connected to said base, a contact mounted on said base for contacting said movable element, and means mounted on said movable element for responding to the weight of the salt for making and breaking contact between said contact and said element, said switch having an inwardly extending passage to permit brine to reach the movable element and the contact and connect the two electrically.

6. An indicator switch responsive to the amount of undissolved salt in a salt dissolving tank, comprising a conducting movable element, means holding a portion of said movable element, a contact connected to said means for contacting said movable element, means mounted on said movable element for responding to the weight of the salt for making and breaking contact between said contact and said element, and a cover on said element and contact having an opening to permit brine to reach the movable element and the contact and connect the two electrically.

7. An indicator switch for water soluble bulk material of an electrovalent compound, comprising a conducting movable element, means supporting said movable element, a contact connected to said means for making contact with said movable element, means for responding to the weight of the material for making and breaking contact between said contact and said element, and a cover on said switch having a passage to permit a solution of the material to reach the movable element and contact.

8. A level indicator switch for material in bulk and solution, comprising a conducting movable element, means supporting said movable element, an electrical contact connected to said means and exposed to the material in solution for making contact with said movable element, and means mounted on said movable element for responding to the weight of the material in bulk for making and breaking contact between said contact and said element.

References Cited in the file of this patent
UNITED STATES PATENTS

| | | |
|---|---|---|
| 1,608,814 | Rioux | Nov. 30, 1926 |
| 2,171,329 | Boone | Aug. 29, 1939 |